United States Patent
Davaillon

(10) Patent No.: US 6,889,485 B2
(45) Date of Patent: May 10, 2005

(54) ARTICLE GROUPING MECHANISM

(75) Inventor: Emmanuel Davaillon, Chateauroux (FR)

(73) Assignee: Meadwestvaco Packaging Systems, LLC, Stamford, CT (US)

( * ) Notice: Subject to any disclaimer, the term of this patent is extended or adjusted under 35 U.S.C. 154(b) by 0 days.

(21) Appl. No.: 10/637,846

(22) Filed: Aug. 7, 2003

(65) Prior Publication Data

US 2004/0112714 A1 Jun. 17, 2004

Related U.S. Application Data

(63) Continuation of application No. PCT/US02/03884, filed on Feb. 9, 2002.

(51) Int. Cl.⁷ .......................... B65B 21/20; B65B 35/36; B65B 35/46
(52) U.S. Cl. .............................. 53/443; 53/247; 53/251; 53/448; 198/419.1; 198/418.7
(58) Field of Search .......................... 53/247, 251, 252, 53/443, 444, 445, 448; 198/419.3, 419.1, 418.7

(56) References Cited

U.S. PATENT DOCUMENTS

| 3,253,694 A | 5/1966 | Kinney |
| 3,294,215 A | 12/1966 | Walter |
| 3,339,700 A | 9/1967 | Wells |
| 3,540,971 A | 11/1970 | Johanski, Jr. |
| 3,767,026 A | 10/1973 | Pagdin et al. |
| 3,987,889 A | 10/1976 | Godoy |
| 4,158,624 A | 6/1979 | Ford et al. |
| 4,408,335 A | 10/1983 | D'Alayer de Costemore d'Arc et al. |
| 4,878,337 A * | 11/1989 | Raudat et al. ................. 53/534 |
| 5,161,664 A * | 11/1992 | LeBras .................... 198/419.3 |
| 5,699,651 A * | 12/1997 | Miller et al. ................... 53/448 |
| 5,704,195 A | 1/1998 | Benz |
| 5,718,323 A | 2/1998 | Flix |
| 5,727,365 A * | 3/1998 | Lashyro et al. ............... 53/448 |
| 5,979,147 A * | 11/1999 | Reuteler ...................... 53/448 |
| 6,360,873 B1 * | 3/2002 | Bonnain et al. ......... 198/419.3 |
| 6,527,102 B2 * | 3/2003 | De Guglielmo et al. . 198/419.3 |
| 6,571,532 B1 * | 6/2003 | Wiernicki et al. ............ 53/247 |

FOREIGN PATENT DOCUMENTS

| DE | 4439728 A1 | 5/1996 |
| EP | 0126553 A2 | 11/1984 |
| EP | 0450915 A1 | 10/1991 |
| EP | 0708028 A1 | 4/1996 |
| GB | 974995 | 11/1964 |
| GB | 1397017 | 11/1975 |
| JP | 57188913 | 11/1982 |
| RU | 583052 | 11/1977 |
| WO | 99/14122 A1 | 3/1999 |

* cited by examiner

Primary Examiner—Rinaldi I. Rada
Assistant Examiner—Hemant M Desai
(74) Attorney, Agent, or Firm—Thomas A. Boshinski

(57) ABSTRACT

A device for grouping articles to be loaded into a carton and delivered to the device from an infeed stream at an infeed end of a packaging machine. The device comprises a leading and trailing spacer elements arranged to move along a first path, each spacer element being adapted to engage at least one article from the infeed stream and to convey the articles through a working reach of the device. The device further comprises adjustment means to adjust the device between a first mode in which each spacer element follows the first path to successively engage an article group; and a second mode in which the trailing spacer element follows the first path and the leading spacer element becomes transferred from the first path to follow a second path connected to the first path before rejoining the first path, whereby the leading and trailing spacer elements engage an article group simultaneously.

13 Claims, 5 Drawing Sheets

ARTICLE GROUPING MECHANISM

This is a continuation of international application No. PCT/US02/03884, filed Feb. 9, 2002, which is hereby incorporated by reference.

BACKGROUND OF THE INVENTION

This invention relates to packaging of primary articles such as cans and bottles in multiple packaged cartons and is more particularly concerned with feeding such articles from an infeed and for loading into a carton.

More particularly, this invention relates to a device for grouping together a plurality of articles from an infeed stream at an infeed end of a packaging machine and is particularly useful for grouping together a plurality of cans or bottles in a multiple packaging machine.

A majority of known packaging machines are dedicated machines which construct only one type of carton. Therefore, modern bottling plants are required to use a plurality of packaging machines to package different carton types, each machine taking up considerable floor space and being expensive to both purchase and operate.

A limited number of packaging machines are capable of packaging different sizes of one carton, for example, six, eight or twelve bottles of a wraparound carton. All such machines require adjustment when switching from one size or type of carton to another. This adjustment includes the manual removal of all of the cartons within the packaging machine and possibly the mechanical adjustment of components in the machine. During this changeover period, which can be thirty minutes or more, a machine cannot be used (known as downtime), which is an expensive delay in a bottling plant. Such a delay may even result in downtime for the entire bottling line, not just the packaging machine, if problems arise during the changeover procedure.

In a known spacer and conveying mechanism disclosed in EP 0 126 553, or EP 0 708 028, a series of spacer elements are spaced apart at fixed locations on the endless chains, each spacer element being configured to engage a plurality of articles from an infeed stream of articles and convey those articles downstream of the machine. The spacing between each spacer element corresponds to the spacing between successive groups of articles. GB A 974 995 discloses a grouping mechanism for grouping articles into package units which comprises a first pair of chains which have lugs spaced apart at fixed intervals for engaging articles at an infeed end of the apparatus. The pair of chains are mounted on opposite sides of a pair of fixed support plates which together with the lugs cooperate to divide the array of articles at the infeed into groups of fixed separation and propel the groups towards a second pair of chains also having lugs spaced apart at fixed intervals. The second pair of chains has a greater downstream velocity compared to the first pair of chains. The upstream article of a group of articles is engaged by a lug of the second pair of chains thereby forcing the groups of articles forward at a greater speed than that determined by the first pair of chains.

SUMMARY OF THE INVENTION

The present invention seeks to overcome the commercial disadvantages of known packaging machines and spacing mechanism by providing a grouping mechanism which is able to group articles for loading into more than one type of carton. Further, the invention is capable of switching from one configuration of grouped articles to another for loading into different carton types or sizes with minimum downtime.

The modular nature of the present invention enables a fully flexible machine to be constructed which overcomes, or at least mitigates, the problems of known machines.

A first aspect of the present invention provides a device for grouping articles to be loaded into a carton and delivered to the device from an infeed stream at an infeed end of a packaging machine. The device comprises leading and trailing spacer elements arranged to move along a predetermined path. Each spacer element is adapted to engage at least one article from the infeed stream and to convey the articles through a working reach of the device. There further comprises an adjustment mechanism to adjust the device between a first mode in which each spacer element follows a first path to successively engage an article group and a second mode in which the trailing spacer element follows the first path and the leading spacer element follows a second path so that the leading and trailing lugs engage an article group simultaneously.

Each spacer element may comprise an engagement portion that is releasably secured to a body portion that in turn is slidably mounted in a transverse direction to the predetermined paths.

Preferably, the first predetermined path is provided by a cam track and a cam follower projecting from the underside of the body portion.

More preferably the second predetermined path is provided by a second cam track and the adjustment mechanism is provided by a blocking element at the entrance of the second cam track, which blocking element is moveable between a blocking position in the first mode to prevent the cam followers of the leading and trailing spacer elements from following the second cam track and a second position that allows the cam follower of the leading spacer element to follow the second cam track and prevents the trailing spacer element from following the same path. In some embodiments, the cam follower of the leading spacer element is shorter than the cam follower of the trailing spacer element. The blocking element may be raised to the blocking position and lowered to the second position by drive means controlled by a controller.

The controller preferably comprises a central processor for controlling the article conveyor, the speed and position of the spacer elements and the adjustment means.

According to an optional feature of this aspect of the present invention, there further comprises a second blocking element to block the exit of the second cam track. The second blocking element may be controlled by a controller to move between the blocking position and the second position.

According to another optional feature of this aspect of the present invention, the speed of the spacer element along the working reach is alterable as required depending on the number of articles in each article group and/or the mode of operation.

The device may be incorporated into a packaging machine having an article infeed, a carton loading station and a device for grouping the articles to be loaded into the cartons.

A second aspect of the invention provides a method of grouping articles delivered from an infeed stream of a packaging machine which method comprises engaging successive articles with spacer elements from the infeed stream so that those articles are located relative to one another during feed movement of the articles so that one group of articles is advanced with respect to and thereby spaced from the next succeeding group of articles while the spacer elements move along the feed path of the articles. The method comprises the step, prior to feeding articles to the carton, of adjusting the device between a first mode in which each spacer element follows a first path to successively engage an article group and a second mode in which the trailing spacer element follows the first path and the leading spacer element follows a second path so that the leading and trailing lugs engage an article group simultaneously.

A third aspect of the invention provides a controller for controlling the operation of an article grouping device, which controller controls the selection means to select the path for the leading and trailing spacer elements and the velocity of one or more of the article feeder, the spacer element conveyor and/or the carton feeder to control the movement through the packaging machine of the articles and cartons.

BRIEF DESCRIPTION OF THE DRAWINGS

Exemplary embodiments will now be described, by way of example only, with reference to the accompanying drawings in which.

DETAILED DESCRIPTION OF THE PREFERRED EMBODIMENTS

A mechanism according to the present invention is capable of grouping articles in different configurations for loading in a variety of carton types for example, fully enclosed, wraparound and basket type cartons with a variety of article configuration and numbers of articles. For example, the mechanism can load fully enclosed cartons for 18 or two lots of 6 articles configured in a 6×3 configuration and two lots of 3×2 configurations respectively. Of course, other configurations are envisaged by not using all the recesses 30 (described below).

The mechanism of the present invention is intended primarily as a module in a packaging machine having carton and article feed streams. Articles such as bottles or cans are generally fed into packaging machines by a conveyor (not shown). An infeed stream of articles in side by side abutting relationship is introduced into the infeed end of the grouping mechanism and the line pressure of the articles is preferably controlled by infeed star wheels (not shown) as is well known.

The article grouping mechanism of the present invention groups the correct number of articles per carton as described below with the mechanism also controlling the flow of articles, so that they can be introduced to the cartons at a loading station (not shown) at the same rate of carton flow downstream of the grouping mechanism.

Figure 1:
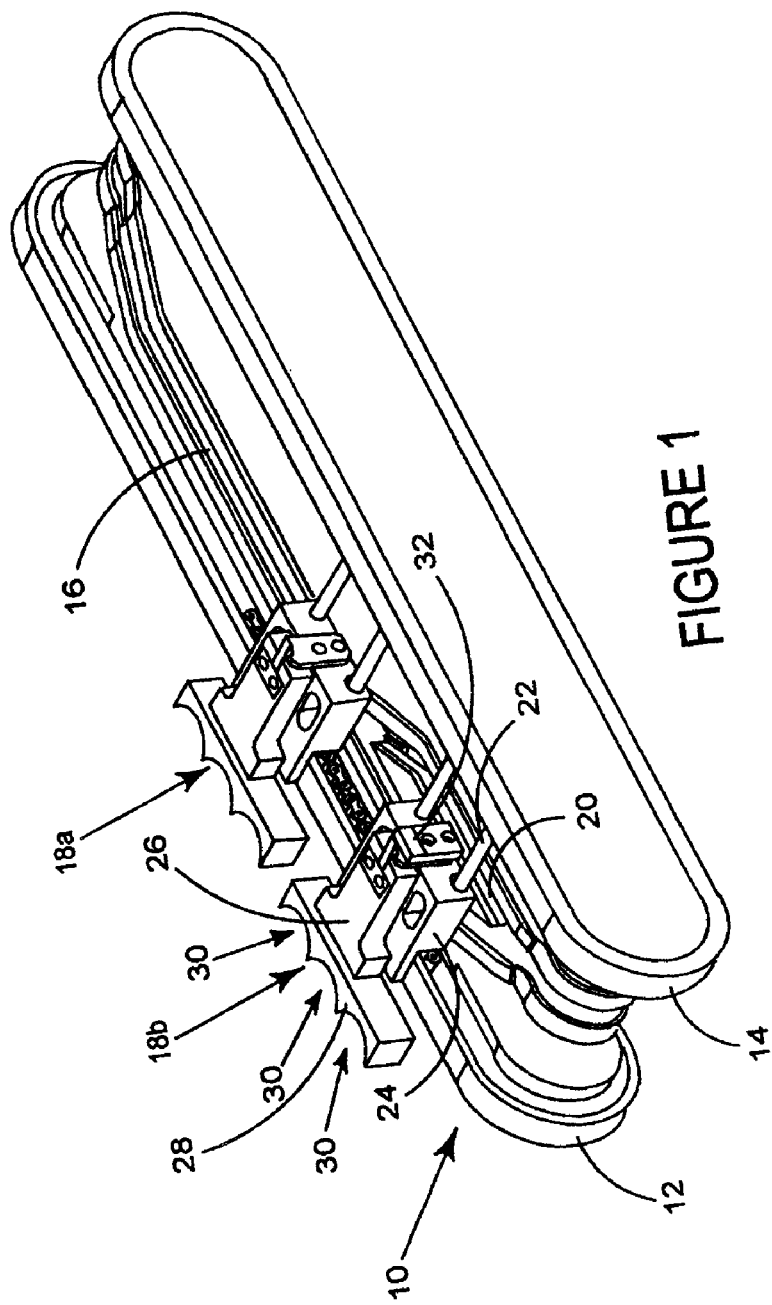
FIG. 1 is a perspective view illustrating an article grouping assembly of an article grouping mechanism according to one embodiment of the present invention.
Figure 4:
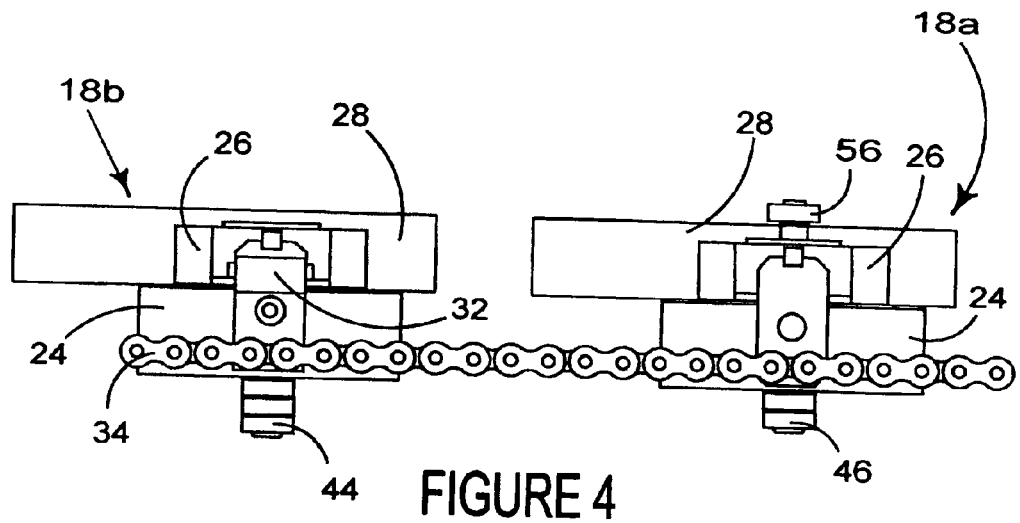
FIG. 4 is a side elevation of the spacer elements of the article grouping mechanism of the present invention, secured onto an endless chain.
Figure 5:
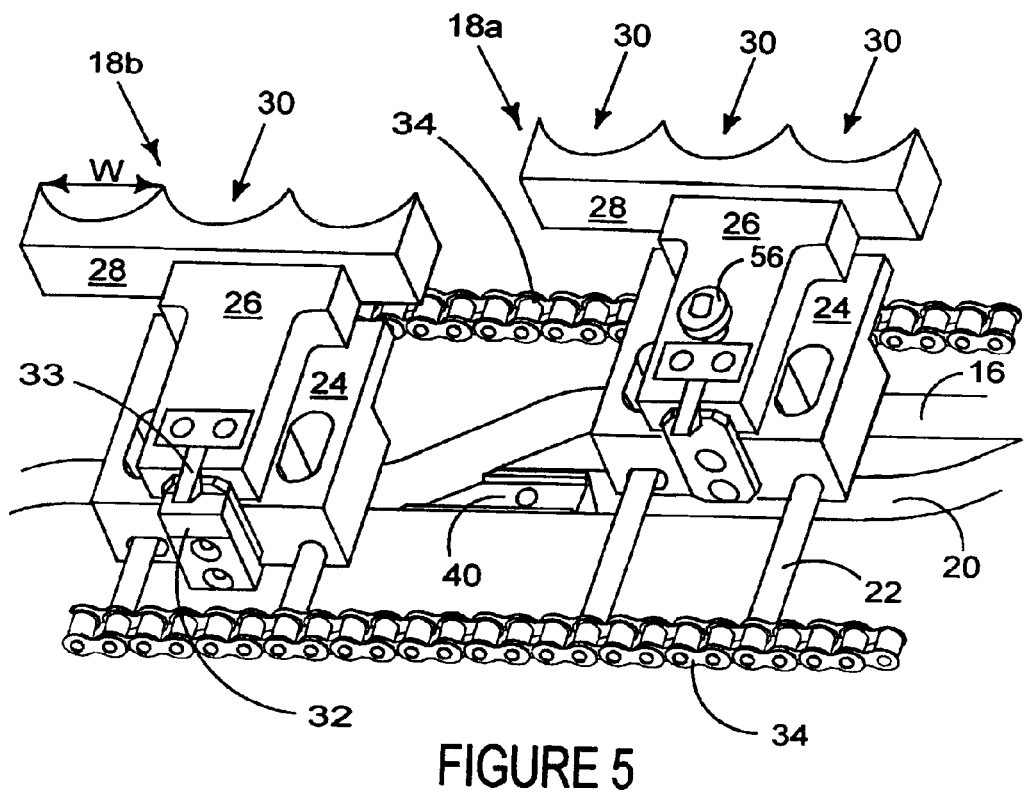
FIG. 5 is a perspective view of the spacer elements and cam track.

The construction of the grouping mechanism will now be described with reference to FIGS. 1 to 7. Referring in particular to FIGS. 1, 4 and 5, the grouping mechanism comprises a grouping assembly 10 positioned on one or each side of the article conveyor (only one side is shown in FIG. 1). Each grouping assembly 10 is identical in construction and therefore only one is described in detail.

The assembly 10 includes a plurality of spacer elements 18 mounted on an endless conveyor (or spacer element conveyor) in the form of a spaced pair of endless chains 34 (see FIG. 5). In this embodiment, each spacer element 18 includes an engagement portion 28 comprising three part cylindrical recesses 30, positioned one to next. If the articles to be packaged are the same size then each recess has an identical length W (FIG. 5) and is shaped substantially to conform substantially to a peripheral wall portion of a bottle or can with which the recess is to engage.

The spacer elements are grouped into pairs with leading and trailing spacer elements.

In this embodiment, the engagement portion is formed integrally with a mounting portion 26, the mounting portion being capable of releasable securement to a body portion 24 of the spacer element using securing means 32 such as a catch, for example. It will be seen that the catch 24 is connected to the body portion 32 and the engaging element 33 (FIG. 5) extends away from the mounting portion 26. Preferably, the engaging element 33 is formed from resiliently biased material, for example a sprung steel strip to flex, so that the engaging element is caused to engage the catch 32. Other known attachments means for example, a quick release bolt assembly could be used instead.

Cam followers 44, 46 project from the underside of the body portions 24 of the spacer elements. As can be seen from FIG. 4, cam follower 44 of the trailing spacer element is longer than follower 46 of the leading element for reasons explained below.

Each spacer element 18 is connected to the endless chains 34 by suitable attachment means. In this embodiment, the body portion 24 of each element is slidably mounted on a pair of bars 22 extending between and secured to the endless chains 34. This arrangement permits transverse movement but prevents a rotational or longitudinal movement of the spacer elements 18 with respect to the endless chains 34.

Figures 2, 3:
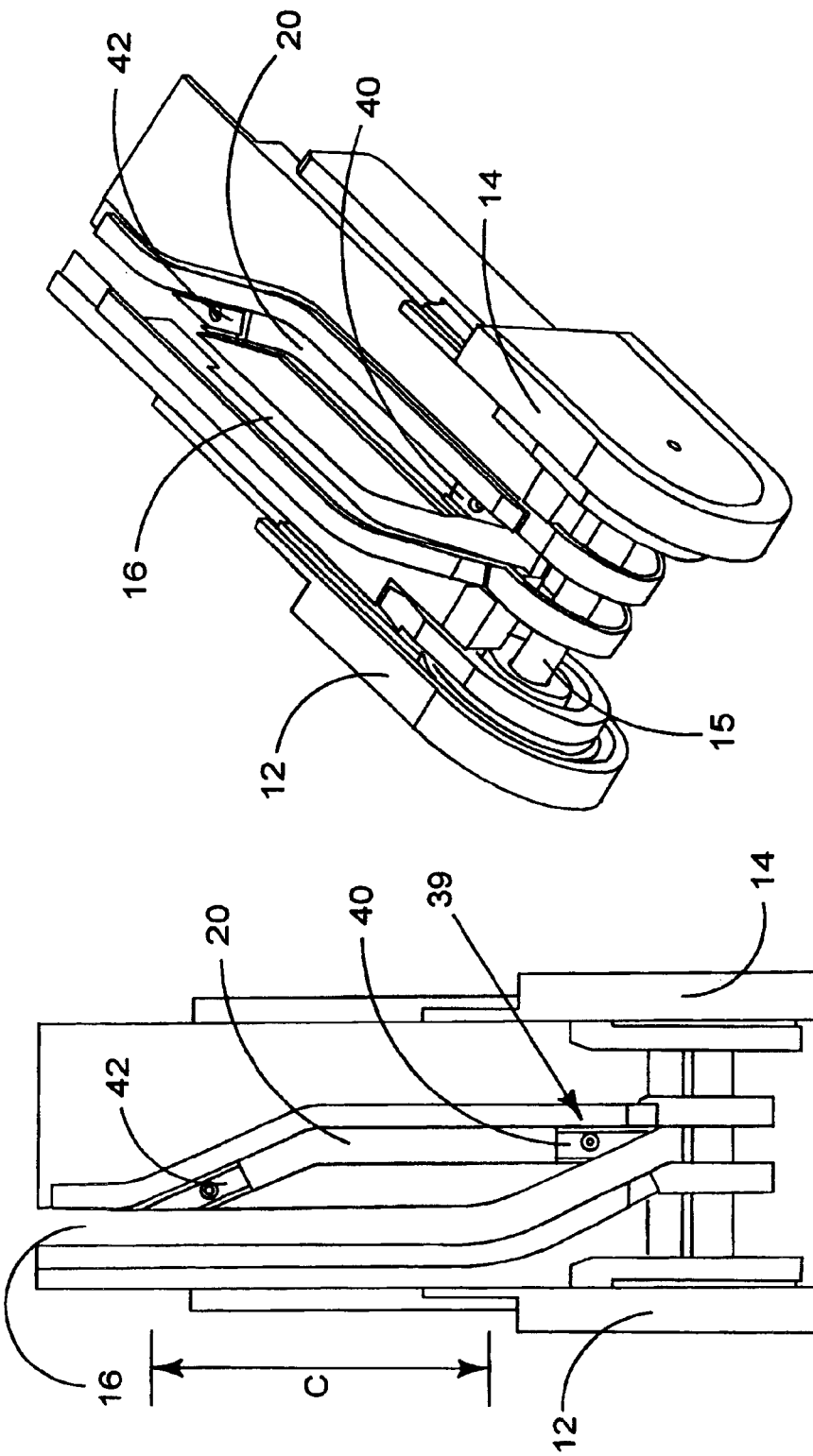
FIG. 2 is a plan view illustrating the cam track used for the article grouping mechanism of FIG. 1.
FIG. 3 is a perspective view of the cam track of FIG. 2.

As can be seen from FIGS. 1 and 2, the endless chains 34 are mounted onto guide tracks 12 and 14 of the assembly 10. The assembly 10 further comprises a cam track 16 to receive the cam followers 44, 46 extending from each spacer element 18. The endless chains 34 are driven by a motor, for example a servo motor (not shown) through a drive shaft 15 (FIG. 2). As each spacer element 18 moves downstream along the path of the cam track 16 the recesses 30 are maintained in a plane parallel to the direction of motion of the articles on the article conveyor.

In order that the mechanism can be used to produce two groupings of between one and three articles length in the flow direction, or alternatively one grouping comprising between four and six articles length in the article flow direction, the mechanism has two modes of operation.

To this end, in addition to the primary cam track 16, that brings the spacer elements into contact with the articles to achieve the desired grouping, a secondary cam track 20 is provided as shown in FIG. 2 such that spacer elements following the secondary cam track 20 are delayed from being deployed into contact with the articles. An adjustment or selecting means 39 is provided at the entrance to the secondary cam track 20 to select whether the leading spacer element 18 enters the secondary track 20 according to the particular mode of operation. A blocking member 42 is preferably provided at the exit of secondary track 20 to ensure that the trailing engagement member 18b does not partially retract when passing the opening or catch in the opening. In this embodiment, the selecting means 39 is provided by a blocking member 40 powered by a pneumatic cylinder to move between raised and lowered positions. Optionally, the blocking member 44 can also move between raised and lowered positions.

Referring now to FIGS. 4 and 5, the grouping mechanism is shown in a first mode of operation. In this mode, identical engagement and mounting portions 28 are used for both the leading and trailing spacer elements 18a, 18b. The engagement portions 28 are arranged such that a gap exists between the leading and trailing portions so that two article groupings are formed. In this mode, blocking member 40 is raised. This blocks the secondary cam track 20 for both the long cam follower 44 of the trailing spacer element 18b and the relatively shorter cam follower 46 of the leading spacer element 18a. Thus, in operation continuous downstream motion of the endless chains 34 causes the leading spacer element 18a to be deployed into engagement with the articles before the trailing spacer element 18b, thus causing the mechanism to form two groupings of articles having a maximum length of three articles and a relatively short pitch therebetween.

Figure 6:
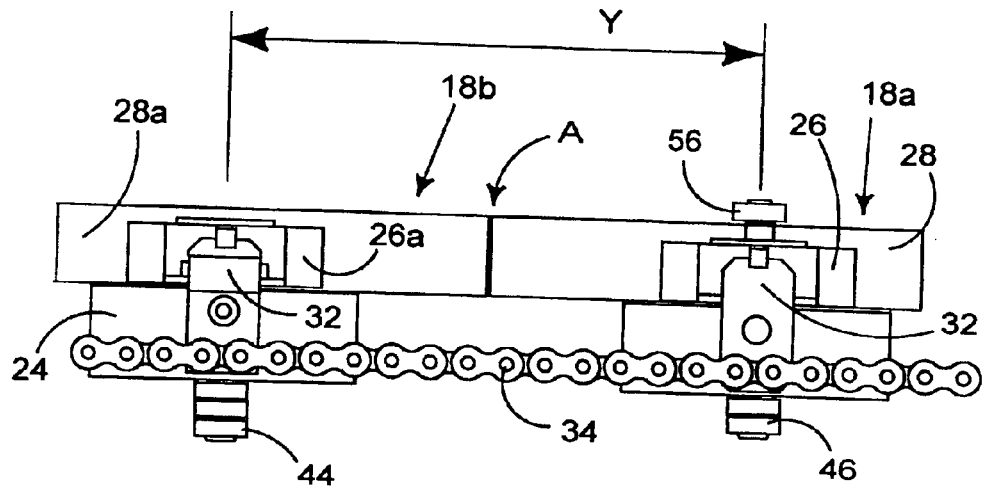
FIG. 6 is a side elevation of the spacer elements in another mode of operation.
Figure 7:
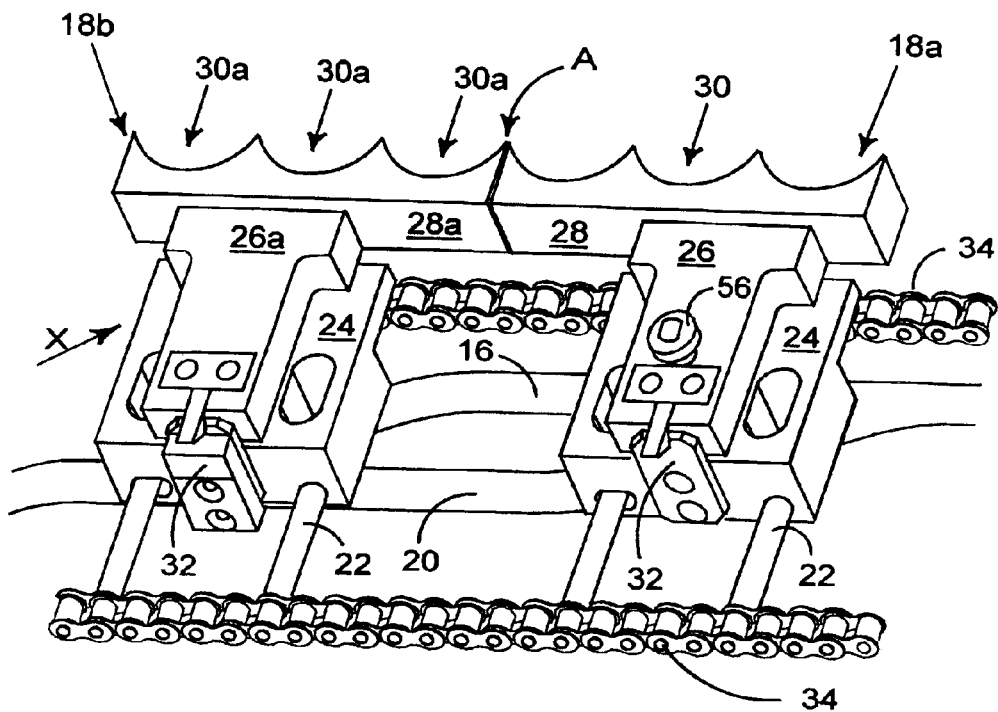
FIG. 7 is a perspective view of the spacer elements in another mode of operation.

Turning now to FIGS. 6 and 7 which illustrate the second mode of operation, in this embodiment alternative mounting and engagement portions 26a, 28a of the trailing spacer element are releasably secured to the body portion 24 of the spacer element using securing means 32. Thus, engaging element 28 abuts engaging element 28a in the region indicated by arrow A thereby forming a continuous array of recesses 30 and 30a capable of engaging with up to six articles.

For the second grouping operation to function satisfactorily it is necessary for all of the recesses 30 and 30a to be moved towards the articles simultaneously. Thus, for this to be achieved, blocking member 40 is lowered to allow one of the article engagement elements 18a, 18b to move along the secondary cam track 20. In this embodiment, the relatively short cam follower 46 of the leading spacer element is caused to travel straight on along the secondary cam track 20, but the relatively long cam follower 44 of the trailing spacer element is caused to continue along the primary cam track 16, as the blocking member 40 prevents entry to the secondary track 20. Thus, as the spacing between corresponding curved portions of the primary and secondary cam tracks 16, 20 is substantially identical to the spacing between the leading and trailing spacer elements 28, 28a, both spacer elements are moved simultaneously in the transverse direction towards the articles indicated by the arrow X and to engage those articles to form a group.

Optionally there is provided an upper fixed guide or cam track (not shown) and a further cam follower 56 mounted on the body portion 26 of the leading spacer element 18a. In use, the cam follower 56 engages the fixed guide to assist in ensuring the leading spacer element 28 follows the second cam track 20. This is used as a back up to the main guiding means.

In a preferred embodiment, a controller such as a microprocessor (not shown) is provided to control the raising and lowering of adjustment means 39 in accordance with the particular cartons to be packaged by the machine at any one time. In a particularly preferred embodiment, control of selecting means 39 is integrated with an overall control system for the machine. It is also further envisaged that rather than using manually interchangeable mounting and engagement portions 26, 28, 26a, 28a the controller may automatically alter the relative linear positions of the engagement portions "on the fly". This is achieved by making the engagement portions 28, 28a moveable with respect to the body portion 26, 26a, for example by a rack and pinion arrangement, powered by suitable drive means.

It should be appreciated that, assuming a constant rate of feed of articles, the number of cartons required to package those articles may potentially be twice as high for the first mode of operation than it would be for the second mode of operation. Thus, if the machine is operating at approaching full carton feed capacity in the second mode, the carton feed may not be capable of keeping pace with article feed if the switch is made to the first mode. Therefore, in a particularly preferred class of embodiments, the controller is further capable of adjusting the article feed rate relative to the carton feed rate to ensure that the optimum throughput is maintained in both modes of operation. This is achieved by altering the velocity of the endless chains 34 by the controller which controls the conveyor drive means.

Figure 8:
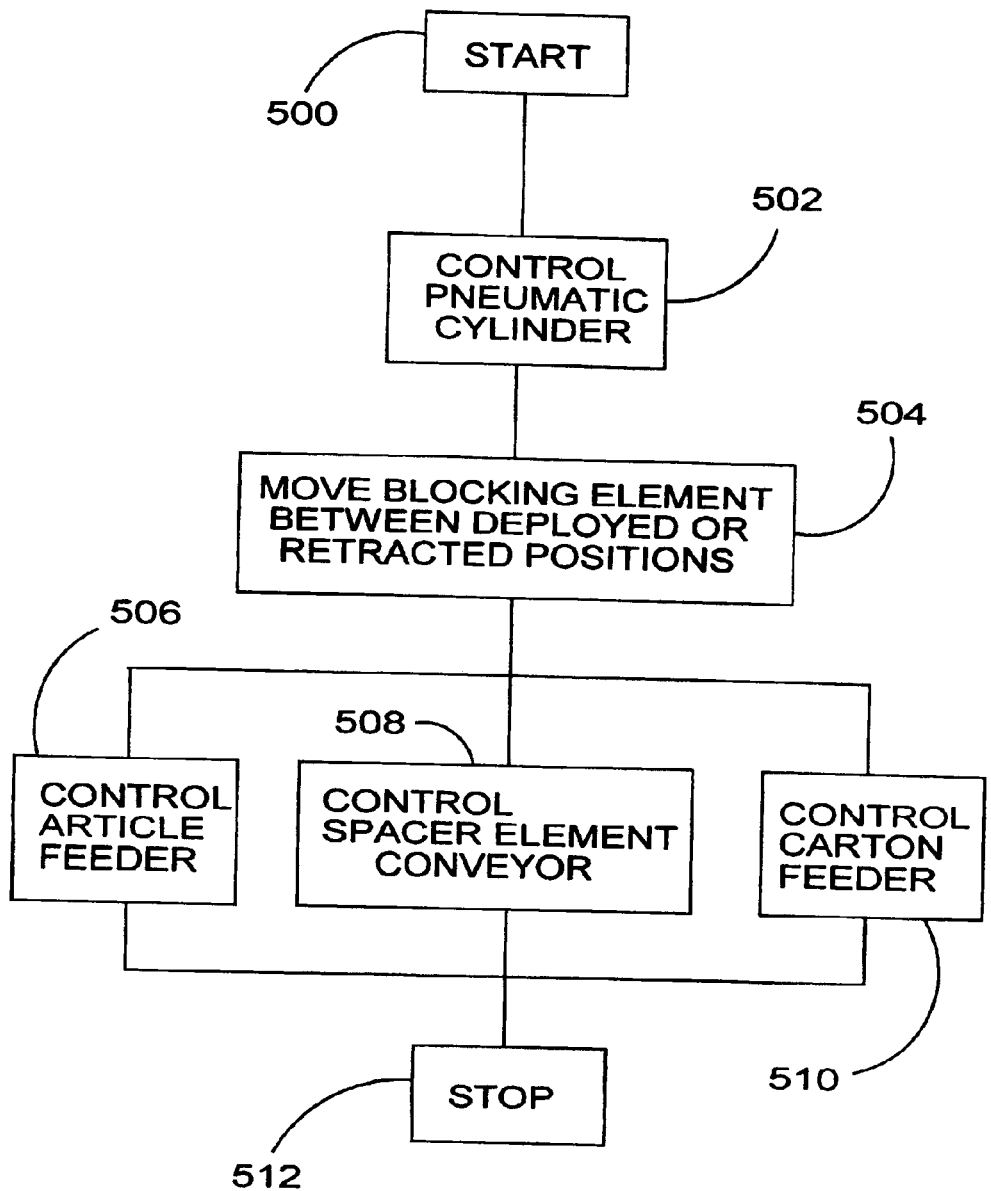
FIG. 8 is a flow diagram of the control system according to one aspect of the invention.

FIG. 8 illustrates an example of a flow diagram of the control system used to control the article grouping device.

The device is started (box 500). The first stage in the system is to control the pneumatic cylinder (box 502) to cause the blocking element 40 of the selection adjustment means 39 to move to either a retracted position (first mode) or deployed position (second mode) (box 504) in order to determine which can track the leading and trailing spacer elements 18, 18a in use. Thereafter, article feeder, spacer element conveyor 34 and carton feeder are started and the relative velocities of each are controlled by the controller (boxes 506, 508 and 510) so as to ensure each part of the machine is operating at the correct speed to optimize throughput of the carton and articles. The machine continues to convey the articles and is controlled by the controller, until a different carton is to be packaged when the process is stopped (box 512). The program is then restarted and the process repeated for the next carton type or article grouping.

The controller may be a dedicated processor or may be a control means for a packaging machine with which the device is used, which is adapted to control the device. Alternatively, the controller may preferably be a known, programmable servo control system.

In some embodiments, the controller receives information from a sensor (not shown) arranged to detect the speed of the spacer elements; which may detect the speed of the elements directly. In addition, the apparatus may include means in the form of a sensor for receiving information regarding the speed of the cartons or articles which is transmitted to the control means. Alternatively, there may be manual input means through which the speed of the cartons on the feed path may be input into the controller.

The positions and speed of these devices can be input manually or a specific pre-written program can be loaded into the central processor for control of the packaging machine. Also, the controlled change over of the machine from one carton type or size to another can be the result of a pre-written program or a manual input signal.

By pre-programming the control system, the adjustments to the machine required to change from packaging one carton type to another carton type can be pre-set, thus reducing the amount of downtime when interchanging carton types or styles. According to this invention, the speed of operation of the apparatus is improved as well as its efficiency and durability. An advantage of the present invention is the flexibility offered by the system.

It should be understood that numerous changes may be made within the scope of the invention. For example, the cam and follower arrangement may be altered as required, the number of recesses on each spacer element may be varied and/or additional spacer elements may be provided. Thus, the endless chains 34 may be provided with a plurality of pairs of spacer elements 18, 18a.

Once the carton has been loaded with articles, the articles and carton are transferred by means of the article conveyor and/or pressure belt to a further set of endless chains with side lugs which are used to transfer the carton to the outfeed end of the machine. During this stage, the construction of the carton is completed as is known in the art.

While the preferred embodiment described herein is for loading bottles into cartons, it will be recognized that the invention is not limited to cartons for bottles. The invention may be used with machines for packaging cans, paperboard "bricks" and other containers into cartons.

It is envisaged that the present invention can be used in various types of packaging machine. Alternatively, the grouping mechanism of the present invention can be sold as an individual module to be fitted to new equipment or to existing equipment on a retro fit basis.

What is claimed is:

1. A device for grouping articles to be loaded into a carton and delivered to the device from an infeed stream at an infeed end of a packaging machine, which device comprises leading and trailing spacer elements arranged to move along a first predetermined path, each of said spacer elements being adapted to engage at least one article from the infeed stream and to convey the articles through a working reach of the device, and adjustment means to adjust the device between a first mode in which said each spacer element follows said first predetermined path to successively engage an article group and a second mode in which said trailing spacer element follows said first predetermined path and said leading spacer element becomes transferred from said first predetermined path to follow a second predetermined path connected to said first predetermined path before rejoining said first predetermined path whereby said leading and trailing spacer elements engage an article group simultaneously.

2. A device as claimed in claim 1 wherein said each spacer element comprises a body portion and an engagement portion releasably secured to said body portion, said body portion being slidably mounted in a transverse direction to a spacer element conveyor.

3. A device as claimed in claim 2 wherein said first predetermined path is provided by a first cam track, and a cam follower projects from an underside of said body portion of said each spacer element.

4. A device as claimed in claim 3 wherein said second predetermined path is provided by a second cam track, said adjustment means comprises a blocking element at the entrance of said second cam track, said blocking element is moveable between a blocking position in said first mode to prevent said cam followers of the leading and trailing spacer elements from following said second cam track and a second position that allows the cam follower of the leading spacer element to follow said second cam track and prevents the trailing spacer element from following the same path.

5. A device as claimed in claim 4 wherein said cam follower of said leading spacer element is shorter than said cam follower of said trailing spacer element.

6. A device as claimed in claim 5 wherein said blocking element is raised to said blocking position and lowered to said second position by drive means controlled by a controller.

7. A device as claimed in claim 6 wherein said controller comprises a central processor for controlling an article conveyor, the speed and position of said spacer elements and said adjustment means.

8. A device as claimed in claim 4 further comprising a second blocking element to block an exit of said second cam track.

9. A device as claimed in claim 8 wherein said second blocking element is controlled by a controller to move between a blocking position and a second position.

10. A device as claimed in claim 1 wherein the speed of said spacer elements along the working reach is alterable as required depending on the number of articles in each article group and/or the mode of operation.

11. A device as claimed in claim 1, further comprising a controller, said controller controlling said adjustment means to select one of said first and second predetermined paths for said leading and trailing spacer elements and the velocity of one or more of an article feeder, a spacer element conveyor and/or a carton feeder to control movement through the packaging machine.

12. A packaging machine having an article infeed, a carton loading station and a device for grouping the articles to be loaded into the cartons, which device comprises leading and trailing spacer elements arranged to move along a first predetermined path, each of said spacer elements being adapted to engage at least one article from the article infeed and to convey the articles through a working reach of the device, and adjustment means to adjust the device between a first mode in which said each spacer element follows said first predetermined path to successively engage an article group and a second mode in which said trailing spacer element follows said first predetermined path and said leading spacer element becomes transferred from said first predetermined path to follow a second predetermined path connected to said first predetermined path before rejoining said first predetermined path whereby said leading and trailing spacer elements engage an article group simultaneously.

13. A method of grouping articles delivered from an infeed stream of a packaging machine, said method comprising engaging successive articles with leading and trailing spacer elements from the infeed stream so that said articles are located relative to one another during feed movement of said articles so that one group of said articles is advanced with respect to and thereby spaced from a next succeeding group of said articles while said leading and trailing spacer elements move along a feed path of said articles, said method further comprising the step prior to feeding said articles to a carton of adjusting the device between a first mode in which each of said leading and trailing spacer elements follows a first path to successively engage an article group and a second mode in which said trailing spacer element follows said first path and said leading spacer element becomes transferred from said first path to follow a second path connected to said first path before rejoining said first path whereby said leading and trailing spacer elements engage an article group simultaneously.

* * * * *